(12) United States Patent
Katsuma et al.

(10) Patent No.: US 7,673,599 B2
(45) Date of Patent: Mar. 9, 2010

(54) VALVE TIMING CONTROL DEVICE FOR AN INTERNAL COMBUSTION ENGINE

(75) Inventors: Masao Katsuma, Chiyoda-ku (JP); Akira Furuta, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 192 days.

(21) Appl. No.: 12/038,149

(22) Filed: Feb. 27, 2008

(65) Prior Publication Data

US 2009/0056652 A1 Mar. 5, 2009

(30) Foreign Application Priority Data

Aug. 28, 2007 (JP) .............................. 2007-221112

(51) Int. Cl.
*F01L 1/34* (2006.01)
(52) U.S. Cl. .................. 123/90.15; 123/90.17; 123/347
(58) Field of Classification Search .............. 123/90.15, 123/90.16, 90.17, 90.18, 90.27, 90.31, 345, 123/346, 347, 348
See application file for complete search history.

(56) References Cited

U.S. PATENT DOCUMENTS 7,398,751 B2 * 7/2008 Kadowaki ................ 123/90.17

FOREIGN PATENT DOCUMENTS

| JP | 2000-064862 A | 2/2000 |
| JP | 2001-152886 A | 6/2001 |

* cited by examiner

*Primary Examiner*—Ching Chang
(74) *Attorney, Agent, or Firm*—Sughrue Mion, PLLC

(57) ABSTRACT

A valve timing control device includes: a unit for calculating a target valve timing for one of an intake valve and an exhaust valve in accordance with an operational state; a unit for detecting an actual valve timing of one of the intake valve and the exhaust valve; an actual valve timing control unit for generating a controlled variable for the VVT based on a difference between the target valve timing and the actual valve timing; a unit for learning a learning value of the controlled variable required for maintenance of the actual valve timing based on an integral correction value; and a unit for detecting a malfunction in a VVT from an amount of a shift in the actual valve timing when learning is not completed yet, and for detecting a malfunction in the VVT from the difference when learning is already completed.

2 Claims, 7 Drawing Sheets

VALVE TIMING CONTROL DEVICE FOR AN INTERNAL COMBUSTION ENGINE

BACKGROUND OF THE INVENTION

1. Field of the Invention

The present invention relates to a valve timing control device for an internal combustion engine which controls valve timings of intake valves and exhaust valves, and more particularly, to a valve timing control device for an internal combustion engine which has a function of detecting an abnormality (malfunction) in a variable valve timing mechanism (VVT).

2. Description of the Related Art

Conventionally, there is well known a device for variably controlling a valve timing of at least one of an intake valve and an exhaust valve in accordance with an operational state. A valve timing control device of this type has a mechanism for variably maintaining and optimizing the valve timing in accordance with the operational state. For example, the timing for opening the intake valve is maintained on an advancement side for the purpose of realizing the function of exhaust gas recirculation (EGR) when the rotational speed of an engine is in a stable intermediate range, and maintained on a retardation side for the purpose of ensuring an output torque or stabilizing operation when the rotational speed of the engine is in a high rotation range or a low rotation range.

Driving performance and exhaust gas properties are influenced when an abnormality occurs in a variable valve timing mechanism (VVT), so a difference or the like between a target valve timing and an actual valve timing is observed to detect the abnormality in the variable valve timing mechanism. There is also proposed a device that detects an abnormality from a difference between a target valve timing and an actual valve timing but prohibits detection of an abnormality for a predetermined time after the start of an engine so as to prevent an erroneous determination from being made when the amount of hydraulic oil is insufficient at the start of the engine (e.g., see JP 2000-64862 A).

An initial value of a learning value, which is one of controlled variables of an actual valve timing, is set immediately after a turning-on of a power supply. It is proposed to set a value smaller than a designed median as the initial value such that the overlap amount of valves becomes relatively small, that is, in consideration of variations among parts, secular changes, or the like (e.g., see JP 08-338271 A).

Further, there is proposed a valve timing control device for an internal combustion engine which equalizes a learning value with a designed median and sets an initial value of an integral term immediately after the turning-on of the power supply to a negative value to make an actual valve timing converge swiftly at a target valve timing, and suppresses the overshoot of the actual valve timing to reliably prevent a degradation of driving performance and a deterioration of exhaust gas properties (e.g., see JP 2001-152886 A).

In each of the aforementioned conventional valve timing control devices, the learning value or the integral value of a controlled variable immediately after the turning-on of the power supply is set to a small value, so the convergence of the actual valve timing at the target valve timing is delayed until the learning of the controlled variable is completed. In making a determination on the occurrence of an abnormality in the variable valve timing mechanism, there is a problem in that it is erroneously determined in some cases that the variable valve timing mechanism is abnormal, despite normalness thereof, owing to a delay in convergence immediately after the turning-on of the power supply.

SUMMARY OF THE INVENTION

The present invention has been made to solve the above-mentioned problem, and it is therefore an object of the present invention to provide a valve timing control device for an internal combustion engine, which is capable of making an accurate determination on the occurrence of an abnormality in a variable valve timing mechanism at any time.

A valve timing control device for an internal combustion engine according to the present invention includes: means for detecting an operational state of the internal combustion engine from various sensor signals; means for calculating a target valve timing for at least one of an intake valve and an exhaust valve of the internal combustion engine in accordance with the operational state; means for detecting an actual valve timing of at least one of the intake valve and the exhaust valve; an actual valve timing control means for generating a controlled variable for a variable valve timing mechanism based on a difference between the target valve timing and the actual valve timing; an integral control means for integrating the difference to calculate an integral correction value for correcting the controlled variable; means for learning a learning value of the controlled variable required for maintenance of the actual valve timing based on the integral correction value; means for detecting, as an initialization condition, an operational state in which the integral correction value should be initialized; means for initializing the integral correction value to an optimal value corresponding to the operational state when the initialization condition is detected; and means for detecting a malfunction in the variable valve timing mechanism according to a first detection method when learning by the unit for learning is not completed yet, and for detecting a malfunction in the variable valve timing mechanism according to a second detection method when learning by the unit for learning is already completed.

The valve timing control device for the internal combustion engine according to the present invention achieves an effect of enabling an accurate determination on the occurrence of an abnormality in a variable valve timing mechanism at any time.

DETAILED DESCRIPTION OF THE PREFERRED EMBODIMENT

First Embodiment

Figure 1:
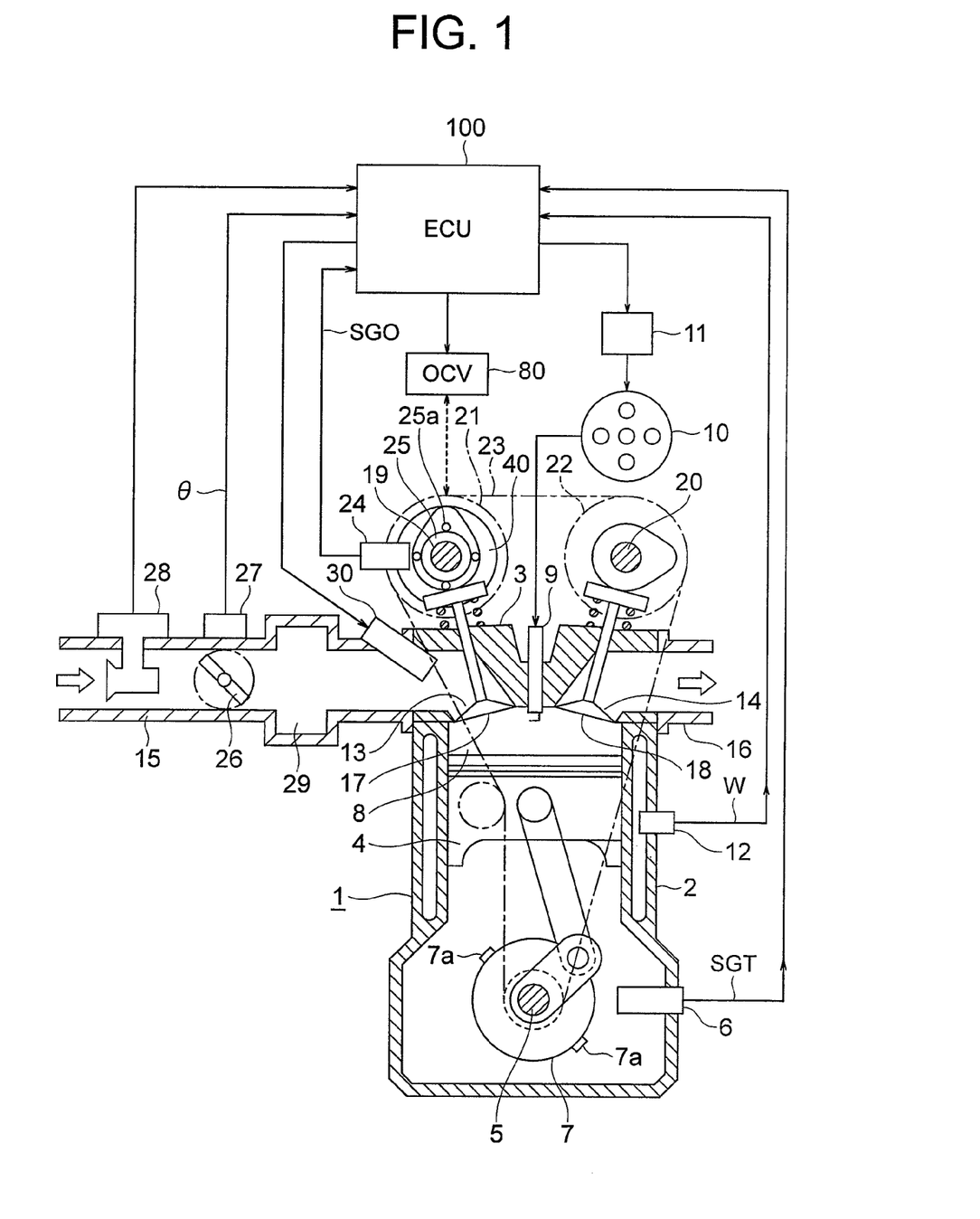
FIG. 1 is a diagram showing an overall cross-sectional construction of an internal combustion engine having a valve timing control device according to a first embodiment of the present invention.

A valve timing control device for an internal combustion engine according to the first embodiment of the present invention will be described with reference to FIGS. 1 to 7. FIG. 1 is a diagram showing an overall cross-sectional construction of the internal combustion engine having the valve timing control device according to a first embodiment of the present invention. In the following description, like reference symbols are used to represent like components or corresponding components in the figures.

Referring to FIG. 1, a variable valve timing mechanism (VVT) 40, which is located close to the substantial center of the figure, is coupled to an intake-side cam shaft 19. The VVT 40 is driven by hydraulic oil (lubricating oil for engine 1) to change the valve timing of an intake valve 17 (or at least one of intake valve 17 and exhaust valve 18).

The VVT 40 changes the displacement angle of the intake-side cam shaft 19 with respect to an intake-side timing pulley 21 to continuously change the valve timing of the intake valve 17. An oil control valve (OCV) 80 supplies the VVT 40 with hydraulic oil and adjusts the amount thereof.

Referring to FIG. 1, an engine 1 includes a plurality of cylinders to constitute a main body of the internal combustion engine. It should be noted herein that only one of the cylinders of the engine 1 is illustrated representatively.

A crank angle sensor 6, which is constituted by, for example, an electromagnetic pickup disposed in the vicinity of a crankshaft 5, outputs a crank angle signal SGT synchronized with rotation of the engine 1. The crank angle sensor 6 is used to detect a rotational speed NE of the engine 1 and detect that the crankshaft 5 is located at a predetermined reference crank angle (° CA).

A coolant temperature sensor 12 is disposed in a cylinder block 2 to detect a temperature of coolant flowing through a coolant passage (coolant temperature) W.

The intake-side timing pulley 21 is fitted at one end of the intake-side cam shaft 19, and an exhaust-side timing pulley 22 is fitted at one end of an exhaust-side cam shaft 20. A timing belt 23 couples the timing pulleys 21 and 22 to the crankshaft 5. The cam shafts 19 and 20 rotate at half of a speed of the crankshaft 5.

During operation of the engine 1, a rotational driving force of the crankshaft 5 is transmitted to the cam shafts 19 and 20 via the timing belt 23 and the timing pulleys 21 and 22, respectively, to rotate the cam shafts 19 and 20.

Thus, the intake valve 17 and the exhaust valve 18 are driven to be opened/closed in synchronization with rotation of the crankshaft 5 and vertical movements of a piston 4.

A cam angle sensor 24 is disposed in the vicinity of the intake-side camshaft 19 to output a cam angle signal SGC for detecting an operation timing (valve timing) of the intake valve 17.

A throttle valve 26, which is disposed midway in an intake passage 15, is driven to be opened/closed in a manner interlocking with an accelerator pedal (not shown) to adjust an amount of air flowing into the engine 1, namely, an intake air amount Q. A throttle sensor 27 is coupled to the throttle valve 26 to detect a throttle opening degree θ.

An intake air amount sensor 28 is disposed upstream of the throttle valve 26 to detect the amount Q of intake air flowing into the intake passage 15 with the aid of, for example, thermal properties.

An electronic control unit (ECU) 100, which is constituted by a microcomputer (which will be described later), drives various actuators (OCV 80, injector 30, igniter 11, and the like) based on various sensor signals indicating an operational state of the engine 1 (crank angle signal SGT, cam angle signal SGC, intake air amount Q, throttle opening degree θ, coolant temperature W, and the like), thereby controlling valve timings, a fuel injection amount, an ignition timing, and the like for the engine 1.

Figure 2:
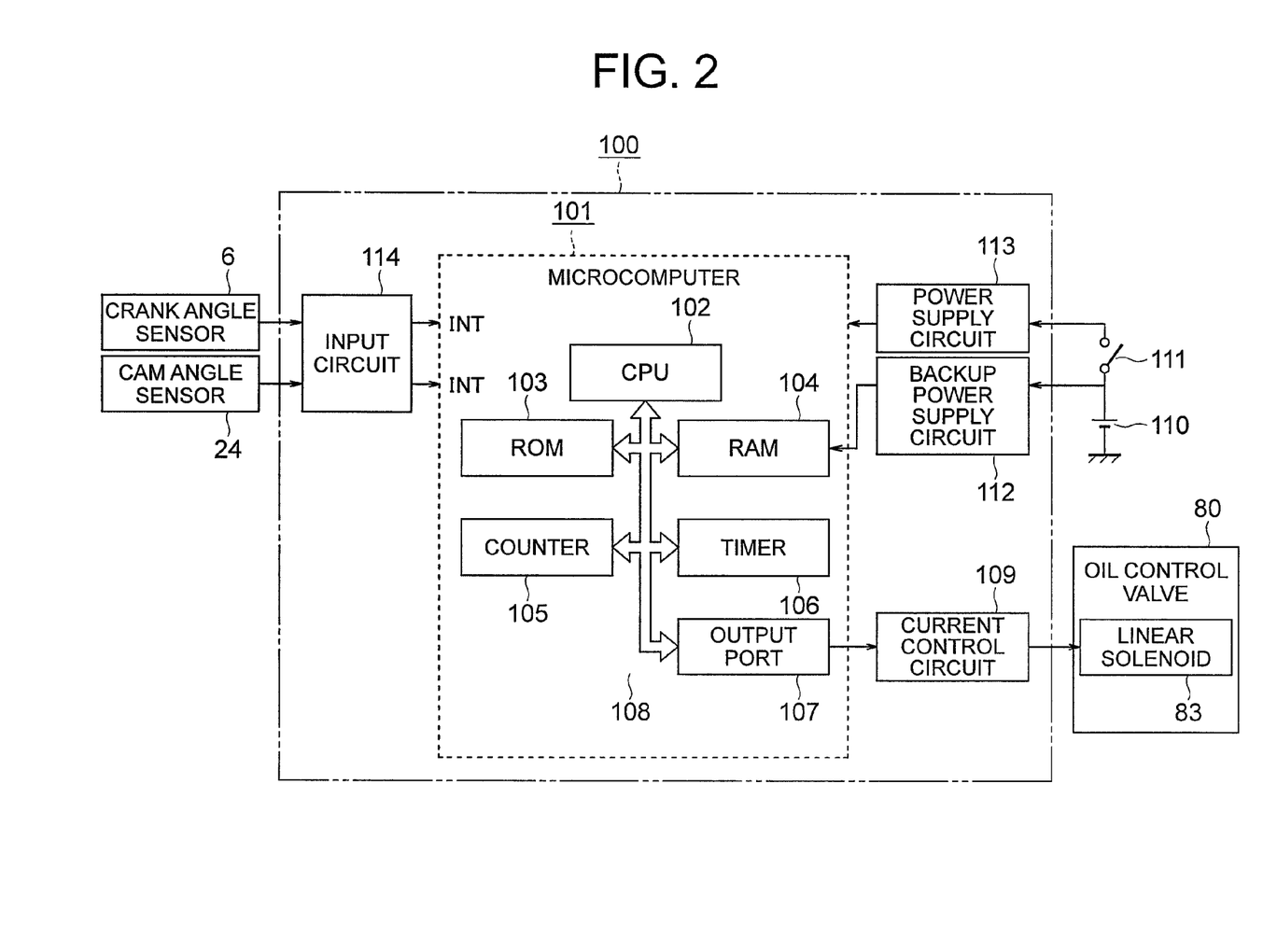
FIG. 2 is a block diagram showing an internal configuration of an electronic control unit (ECU) of FIG. 1.

FIG. 2 is a block diagram showing an internal configuration of the electronic control unit (ECU) of FIG. 1.

Referring to FIG. 2, the electronic control unit (ECU) 100 is provided with an input circuit 114 to which the crank angle sensor 6, the cam angle sensor 24, and the like are connected, a microcomputer 101, a power supply circuit 113, a backup power supply circuit 112, and a current control circuit 109 connected to a linear solenoid 83 of the OCV 80.

The microcomputer 101 is constituted by a CPU 102 for making various calculations and determinations, a ROM 103 in which predetermined control programs and the like are stored in advance, a RAM 104 for temporarily storing a calculation result obtained by the CPU 102 and the like, a counter 105 for measuring a frequency of an input signal and the like, a timer 106 for measuring a driving time of an output signal and the like, an output port 107 serving as an output interface, and a common bus 108 connecting respective blocks together.

The current control circuit 109 controls a linear solenoid current i of the OCV 80. The CPU 102 controls the linear solenoid current i of the OCV 80 based on various input signals, and outputs a duty signal corresponding to the linear solenoid current i of the OCV 80 to the output port 107 based on a result obtained by measurement of a time by the timer 106. The current control circuit 109 performs control based on the duty signal such that the linear solenoid current i flows through the linear solenoid 83 of the OCV 80, thereby performing valve timing control.

Figure 3:
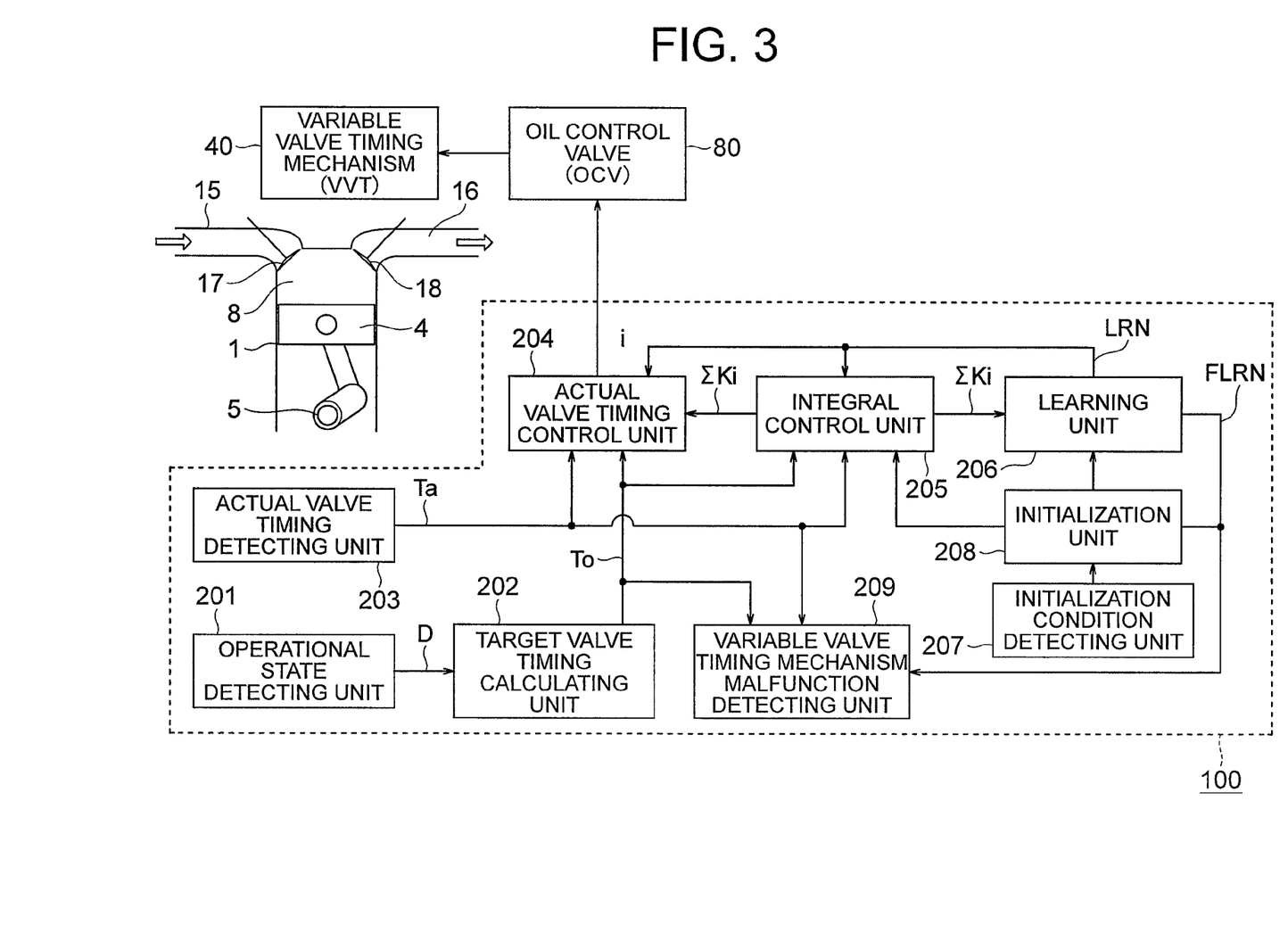
FIG. 3 is a block diagram showing a functional configuration of the valve timing control device for the internal combustion engine according to the first embodiment of the present invention.

FIG. 3 is a block diagram showing a functional configuration of the valve timing control device for the internal combustion engine according to the first embodiment of the present invention.

Referring to FIG. 3, the valve timing control device for the internal combustion engine according to the first embodiment of the present invention is provided with an operational state detecting unit 201, a target valve timing calculating unit 202, an actual valve timing detecting unit 203, an actual valve timing control unit 204, an integral control unit 205, a learning unit 206, an initialization condition detecting unit 207, an initialization unit 208, and a variable valve timing mechanism malfunction detecting unit 209. The blocks represent the functions of operation programs in the ECU 100.

Next, the operation of the valve timing control device for the internal combustion engine according to the first embodiment of the present invention will be described with reference to the drawings.

Referring to FIG. 3, the operational state detecting unit 201 detects an operational state D of the internal combustion engine from the various sensor signals (see FIG. 1). The target valve timing calculating unit 202 calculates a target valve timing To for at least one of the intake valve 17 and the exhaust valve 18 in accordance with the operational state D.

The actual valve timing detecting unit 203 detects an actual valve timing Ta of at least one of the intake valve 17 and the exhaust valve 18.

The actual valve timing control unit 204 generates a controlled variable for the OCV 80 (linear solenoid current i) based on a difference ER between the target valve timing To and the actual valve timing Ta and the like. The integral control unit 205 integrates the difference ER between the timings To and Ta to calculate an integral correction value ΣKi for correcting the linear solenoid current i. The learning unit 206 learns a learning value LRN of the controlled variable required for the maintenance of the actual valve timing Ta (holding current ih) based on the integral correction value ΣKi.

In addition, the initialization condition detecting unit 207 detects, as an initialization condition, an operational state in which the integral correction value ΣKi should be initialized. The initialization unit 208 initializes the integral correction value ΣKi to an optimal value corresponding to the operational state when the initialization condition is detected. In detecting a malfunction (abnormality) in the variable valve timing mechanism (VVT), the variable valve timing mechanism malfunction detecting unit 209 detects the malfunction in the variable valve timing mechanism from an amount of a shift in the actual valve timing Ta when the learning is not completed yet, and detects the malfunction in the variable valve timing mechanism from the difference between the target valve timing To and the actual valve timing Ta when the learning is already completed.

Figure 4:
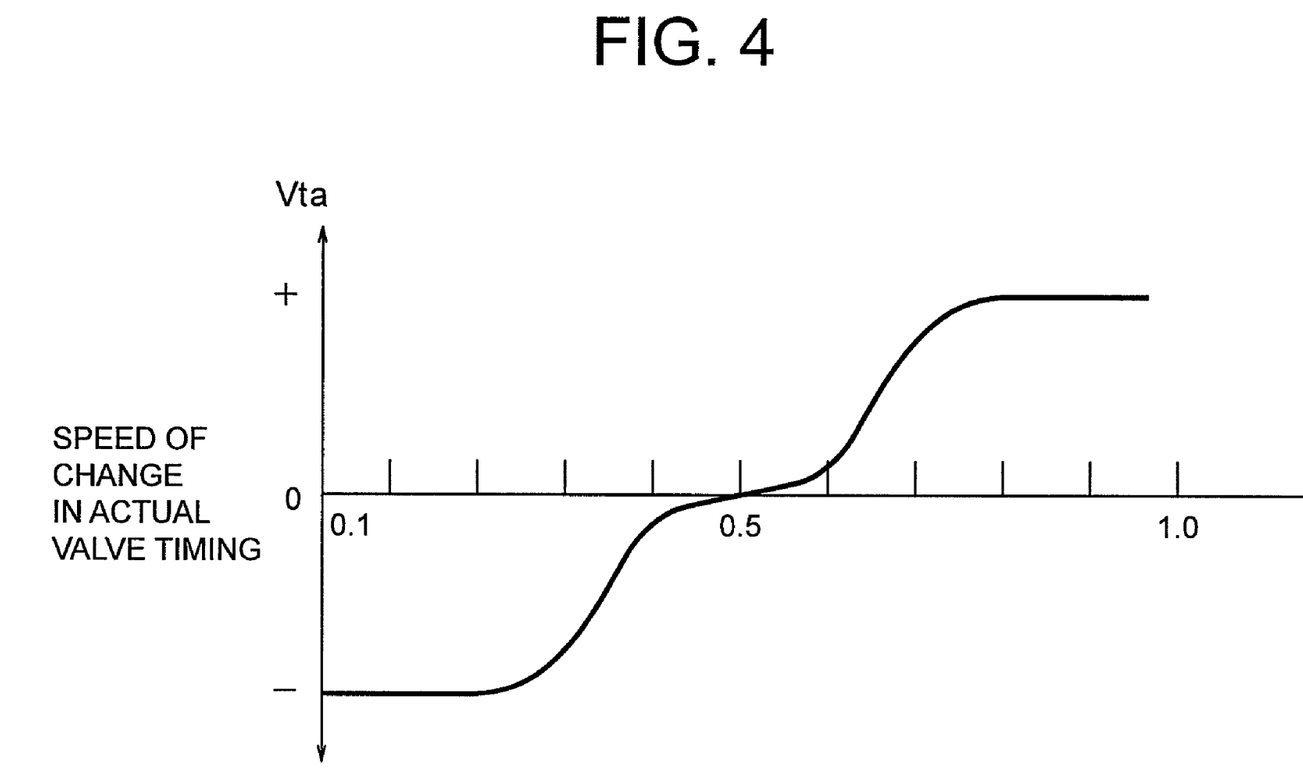
FIG. 4 is a characteristic diagram showing a relationship between a current value of a linear solenoid and a speed of change in actual valve timing.
Figure 5:
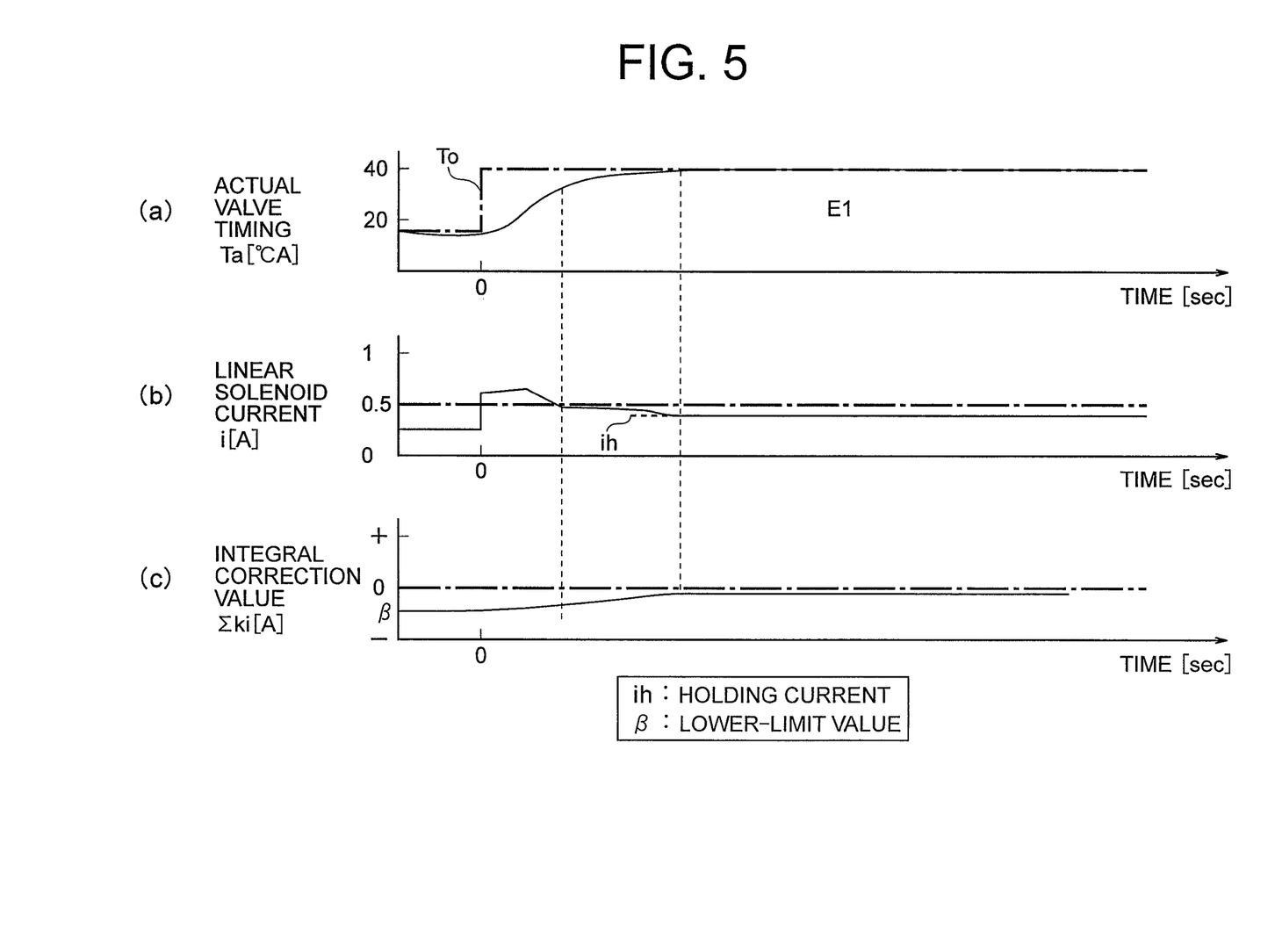
FIGS. 5A to 5C are timing charts each showing an initialization operation of the valve timing control device for the internal combustion engine according to the first embodiment of the present invention immediately after the turning-on of a power supply.

FIG. 4 is a characteristic diagram showing a relationship between a current value of the linear solenoid 83 and a speed of change in the actual valve timing Ta.

FIG. 4 illustrates a speed VTa of change in the actual valve timing Ta for the linear solenoid current i under a predetermined operational condition of the engine 1. A range in which the speed VTa of change in the actual valve timing Ta is positive corresponds to a range in which the actual valve timing Ta shifts in the direction of advancement, and a range in which the speed VTa of change in the actual valve timing Ta is negative corresponds to a range in which the actual valve timing Ta shifts in the direction of retardation. A linear solenoid current ib (0.5 A) at which the actual valve timing Ta does not change is referred to as holding current ih. In general, it is appropriate to set the linear solenoid current i large with respect to the holding current ih when advancement of the valve timing is desired, and in contrast, small with respect to the holding current ih when retardation of the valve timing is desired.

The actual valve timing control unit 204 in the ECU 100 performs PI control using the integral correction value ΣKi and the learning value LRN, which are obtained from the integral control unit 205 and the learning unit 206, respectively, in accordance with the difference ER between the target valve timing To and the actual valve timing Ta, thereby making the actual valve timing Ta converge at the target valve timing To. The linear solenoid current i of the OCV 80 at this moment is given by an expression (1) shown below.

$$i = KP \times ER + \Sigma Ki + LRN + 0.5\ A \quad (1)$$

It should be noted herein that a gain KP corresponds to a proportional operation. The difference ER between the timings To and Ta in the expression (1) is calculated according to an expression (2) shown below.

$$ER = To - Ta \quad (2)$$

In the expression (1), a gain Ki corresponds to an integral operation. An integral term (summative term) ΣKi, which is an integral correction value obtained by integrating an increased/reduced value calculated based on the difference ER between the timings To and Ta, is calculated according to an expression (3) shown below.

$$\Sigma Ki = \Sigma Ki(j-1) + Ki \times ER \quad (3)$$

In the expression (3), an integral term ΣKi(j−1) is an integral correction value before integration of a present value thereof, and Ki×ER corresponds to a present integral increased/reduced value. The gain Ki, which is set to a very small value, is controlled such that the integral correction value ΣKi does not fluctuate drastically even when the difference ER between the timings To and Ta, which is transiently caused at the time of a step response or the like, increases. Thus, destabilization of control is prevented.

Owing to the aforementioned control, the actual valve timing Ta changes in accordance with changes in the target valve timing To so as to converge at the target valve timing To.

In a convergence state in which the target valve timing To is substantially constant and the absolute value of the difference ER between the timings To and Ta is smaller than a predetermined value E1, the linear solenoid current i based on the aforementioned expression (1) is considered to substantially represent the actual holding current ih. Therefore, the learning unit 206 learns the learning value LRN in the following manner based on the integral correction value ΣKi.

The learning unit 206 calculates the learning value LRN based on an average value (or smoothed value) of the integral correction value ΣKi. For example, the learning unit 206 calculates the learning value LRN based on an average value of integral correction values ΣKi corresponding to a plurality of times in the past at the time of inversion of the direction in which the integral correction value ΣKi increases or decreases.

The learning unit 206 has a learning counter CLRN. The learning unit 206 counts up the learning counter CLRN in, for example, the convergence state in which the target valve timing To is substantially constant and the difference ER between the timings To and Ta is smaller than the predetermined value E1, and learns the learning value LRN when the value of the learning counter CLRN becomes equal to or larger than a predetermined value. The value of the learning counter CLRN is reset to 0 when the target valve timing To is not constant or the absolute value of the difference ER between the timings To and Ta is equal to or larger than the predetermined value E1.

Further, the learning unit 206 sets a learning completion flag FLRN to a value indicating a learning completion (completed) state (FLRN=1) at a timing when the learning value LRN is learned.

Owing to the function of the backup power supply circuit 112, the learning value LRN is stored and held in the RAM 104 even while a key switch 111 is off. Therefore, the actual valve timing Ta can be made to swiftly converge at the target valve timing To even when the key switch 111 is just been turned on. The learning value LRN is initialized to "0" immediately after a battery 110 is connected.

When the learning value LRN learned by the learning unit 206 is updated, the integral control unit 205 reduces the integral correction value ΣKi by an increase in the learning value LRN, or increases the integral correction value ΣKi by a decrease in the learning value LRN.

On the other hand, the initialization condition detecting unit 207 detects a timing immediately after the supply of power to the ECU 100 as an initialization condition, and the initialization unit 208 sets the initial value of the integral correction value ΣKi to a negative value. Also, the initialization unit 208 sets the learning completion flag FLRN to a value indicating a learning incompletion (uncompleted) state (FLRN=0).

That is, the initialization unit 208 sets the initial value of the learning value LRN to the designed median (=0.5 A) and sets the initial value of the integral correction value ΣKi to a negative value when the learning value LRN is not learned yet. The initialization unit 208 sets the initial value of the integral correction value ΣKi to 0 when the learning value LRN is already learned.

In this case, the initial value of the integral correction value ΣKi is negative even when the initial value of the learning value LRN is the designed median. Therefore, the linear solenoid current i rises from a current value smaller than the designed median (0.5 A) as is apparent from FIG. 5B.

FIGS. 5A to 5C are timing charts each showing an initialization operation of the valve timing control device for the internal combustion engine according to the first embodiment of the present invention immediately after the turning-on of the power supply.

Accordingly, as indicated by FIGS. 5A and 5B, the linear solenoid current i is suppressed while the actual valve timing Ta rises toward the target valve timing To. The integral correction value ΣKi starts increasing gradually from a negative value toward 0 as indicated by FIG. 5C.

As the integral correction value ΣKi increases, the actual valve timing Ta gradually approaches the target valve timing To as indicated by FIG. 5A, and the linear solenoid current i gradually decreases and converges at the holding current ih as indicated by FIG. 5B.

Accordingly, even when the linear solenoid current i for maintaining the phase of the VVT 40 (holding current ih) is smaller than the designed median (0.5 A), the actual valve timing Ta does not overshoot at the time of initialization. Thus, the amount of valve overlap can be restrained from increasing.

Figure 6:
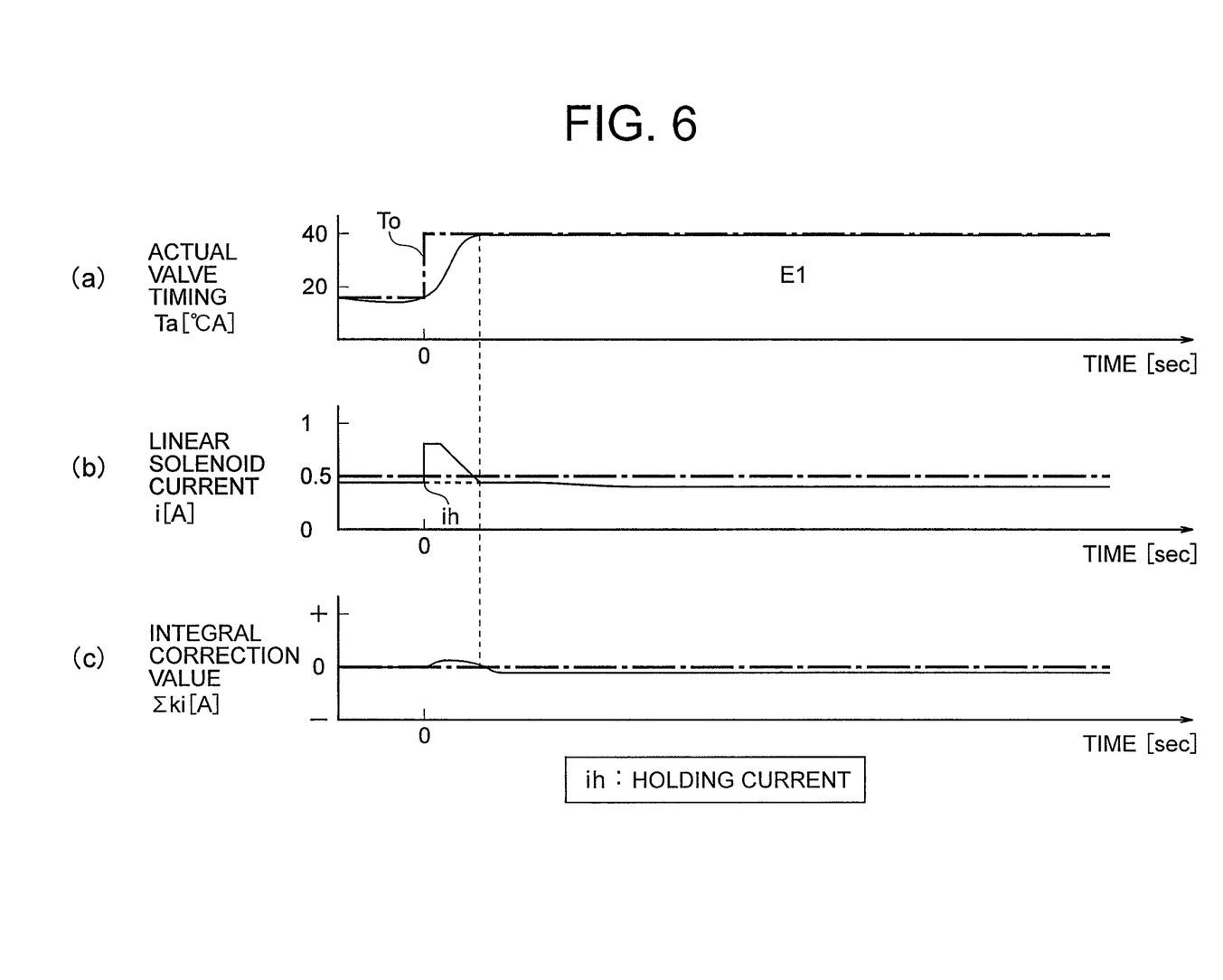
FIGS. 6A to 6C are timing charts each showing an operation of the valve timing control device for the internal combustion engine according to the first embodiment of the present invention at the time when learning is completed.

On the other hand, a valve timing operation in the case where the initialization condition detected by the initialization condition detecting unit 207 is unfulfilled immediately after the turning-on of the power supply will be described with reference to FIG. 6.

FIGS. 6A to 6C are timing charts each showing an operation of the valve timing control device for the internal combustion engine according to the first embodiment of the present invention at the time when learning has been completed.

In the case where the initialization condition detected by the initialization condition detecting unit 207 is unfulfilled immediately after the turning-on of the power supply, the learning value LRN is set to a last-set value, and the integral correction value ΣKi is set to 0. At this moment, the learning value LRN has already been set, so the linear solenoid current i as the initial value of the integral correction value ΣKi rises from a current value close to the holding current ih as indicated by FIG. 6B.

Accordingly, while the actual valve timing Ta rises toward the target valve timing To, the linear solenoid current i starts changing from a value larger than a value during the initialization operation as indicated by FIG. 6B. The actual valve timing Ta converges at the target valve timing To in a period of time shorter than a period of time during the initialization operation as indicated by FIG. 6A.

As described above, the time required for convergence of the actual valve timing Ta at the target valve timing To differs depending on whether the learning completion flag FLRN indicates the learning completion state or the learning incompletion state. Therefore, in detecting a malfunction from a difference between a target valve timing and an actual valve timing as in conventional cases, it may be erroneously determined that there is a malfunction despite a normal state at the time when learning is not completed.

Next, detection of a malfunction in the variable valve timing mechanism according to the first embodiment of the present invention will be described concretely with reference to FIG. 7.

Figure 7:
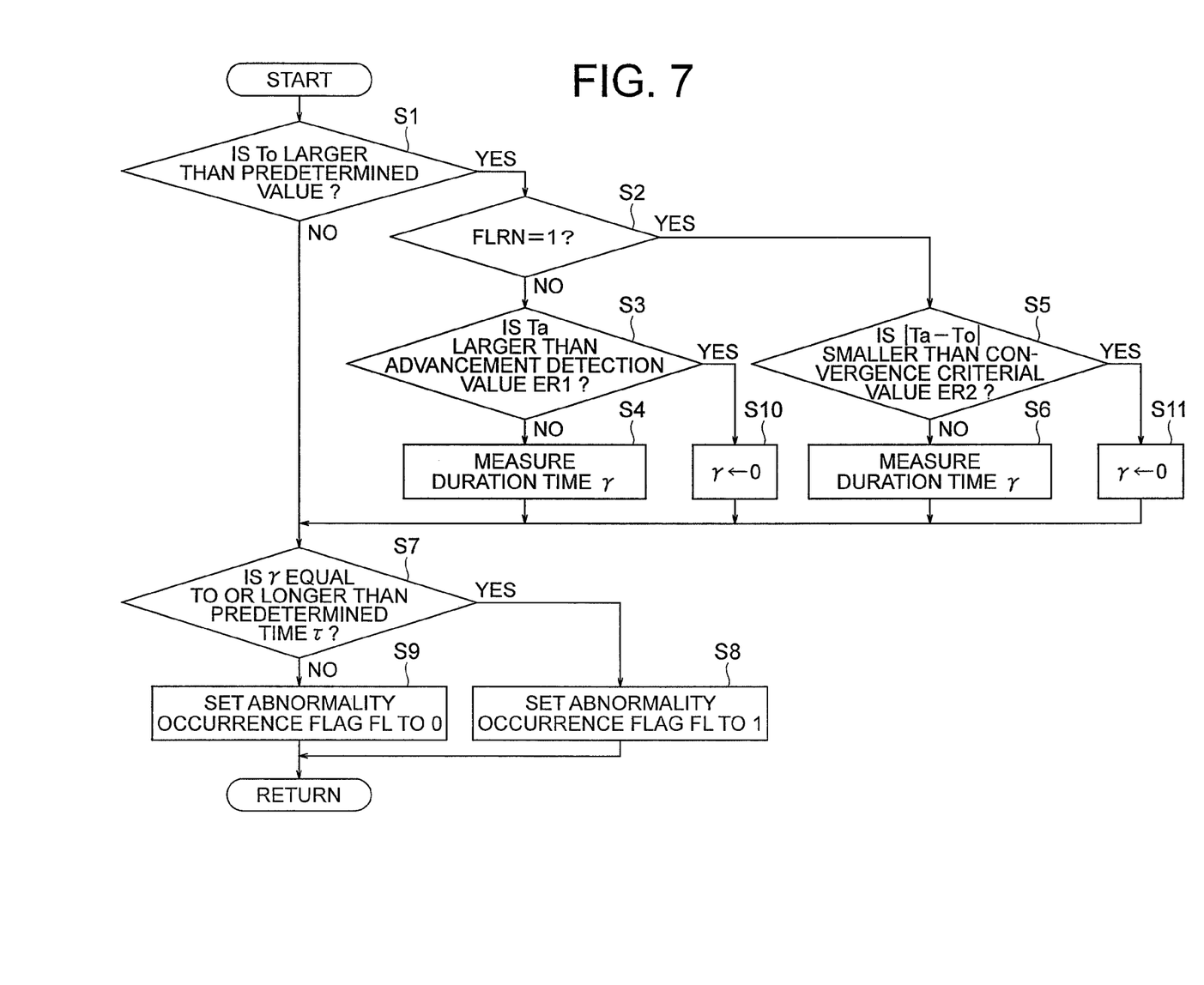
FIG. 7 is a flowchart showing an operation of a variable valve timing mechanism malfunction detecting unit of the valve timing control device for the internal combustion engine according to the first embodiment of the present invention.

FIG. 7 is a flowchart showing an operation of the variable valve timing mechanism malfunction detecting unit of the valve timing control device for the internal combustion engine according to the first embodiment of the present invention.

First of all, in Step S1, it is determined whether or not an advancement command (command to change a valve timing) has been output to a valve timing. That is, it is determined whether or not the target valve timing To is larger than a predetermined value (e.g., 20 to 30° CA). When the target valve timing To is larger than the predetermined value, a transition to Step S2 is made to detect a malfunction. When the target valve timing To is equal to or smaller than the predetermined value, a duration time γ is set equal to 0 and a transition to Step S7 is made.

It is then determined in Step S2 whether the learning completion flag FLRN indicates the learning completion state or the learning incompletion state. When the learning completion flag FLRN indicates the learning completion state, a transition to Step S5 is made. When the learning completion flag FLRN indicates the learning incompletion state, a transition to Step S3 is made.

It is then determined in Step S3 whether or not the actual valve timing Ta is larger than a preset advancement detection value ER1 (e.g., 5° CA). When the actual valve timing Ta is larger than the advancement detection value ER1, a transition to Step S10 is made. When the actual valve timing Ta is equal to or smaller than the advancement detection value ER1, a transition to Step S4 is made.

Then in Step S4, when the actual valve timing Ta is equal to or smaller than the advancement detection value ER1, the duration time γ is measured (integrated). For example, the counter is counted up by 1. After that, a transition to Step S7 is made.

Then in Step S5, an absolute value of a difference between the target valve timing To and the actual valve timing Ta is calculated. It is determined whether or not the absolute value is smaller than a convergence criterial value ER2 (e.g., 5° CA). When the absolute value is smaller than the convergence criterial value ER2, a transition to Step S11 is made. When the absolute value is equal to or larger than the convergence criterial value ER2, a transition to Step S6 is made.

Then in Step S6, when the absolute value of the difference between the target valve timing To and the actual valve timing Ta is equal to or larger than the convergence criterial value ER2, the duration time γ is measured (integrated). For example, the counter is counted up by 1. After that, a transition to Step S7 is made.

In Step S10, when the actual valve timing Ta is larger than the advancement detection value ER1, the duration time γ is set to 0. For example, the counter is cleared. After that, a transition to Step S7 is made.

In Step S11, when the absolute value of the difference between the target valve timing To and the actual valve timing Ta is smaller than the convergence criterial value ER2, the duration time γ is set to 0. For example, the counter is cleared. After that, a transition to Step S7 is made.

It is determined in Step S7 whether or not the duration time (integral value) γ is equal to or longer than a predetermined time τ (e.g., 5 seconds). When the duration time γ is equal to or longer than the predetermined time τ, a transition to Step S8 is made. When the duration time γ is shorter than the predetermined time τ, a transition to Step S9 is made.

In Step S8, when the duration time γ is equal to or longer than the predetermined time τ, it is determined that there is a malfunction (abnormality). An abnormality occurrence flag FL is then set (FL=1).

In Step S9, when the duration time γ is shorter than the predetermined time τ, it is determined that there is no malfunction (abnormality). The abnormality occurrence flag FL is then reset (FL=0).

The aforementioned predetermined time τ is set sufficient for the actual valve timing Ta to reach the advancement detection value ER1 even when the learning completion flag FLRN for the holding current ih indicates the learning incompletion state, and sufficient for the actual valve timing Ta to converge at the target valve timing To when the learning completion flag FLRN for the holding current ih indicates the learning completion state. Thus, a determination on the occurrence of a malfunction can be made by changing the method of detecting a malfunction in the variable valve timing mechanism even when the ECU 100 is just supplied with power. As a result, the occurrence of an erroneous determination can be prevented.

What is claimed is:

1. A valve timing control device for an internal combustion engine, comprising:
   means for detecting an operational state of the internal combustion engine from various sensor signals;
   means for calculating a target valve timing for at least one of an intake valve and an exhaust valve of the internal combustion engine in accordance with the operational state;
   means for detecting an actual valve timing of at least one of the intake valve and the exhaust valve;
   actual valve timing control means for generating a controlled variable for a variable valve timing mechanism based on a difference between the target valve timing and the actual valve timing;
   integral control means for integrating the difference to calculate an integral correction value for correcting the controlled variable;
   means for learning a learning value of the controlled variable required for maintenance of the actual valve timing based on the integral correction value;
   means for detecting, as an initialization condition, an operational state in which the integral correction value should be initialized;
   means for initializing the integral correction value to an optimal value corresponding to the operational state when the initialization condition is detected; and
   means for detecting a malfunction in the variable valve timing mechanism according to a first detection method when learning by the means for learning is not completed yet, and detecting a malfunction in the variable valve timing mechanism according to a second detection method when learning by the means for learning is already completed.

2. A valve timing control device for an internal combustion engine according to claim 1, wherein the means for detecting a malfunction in the variable valve timing mechanism detects a malfunction in the variable valve timing mechanism from an amount of a shift in the actual valve timing when learning by the learning means is not completed yet, and detects a malfunction in the variable valve timing mechanism from a difference between the target valve timing and the actual valve timing when learning by the learning means is already completed.

* * * * *